United States Patent
Song et al.

(10) Patent No.: US 9,451,269 B2
(45) Date of Patent: Sep. 20, 2016

(54) METHOD AND APPARATUS FOR DETERMINING OFFSET VALUES USING HUMAN VISUAL CHARACTERISTICS

(71) Applicant: SAMSUNG ELECTRONICS CO., LTD., Suwon-si (KR)

(72) Inventors: Hak-sup Song, Suwon-si (KR); Jae-hwan Joo, Seoul (KR); Chan-yul Kim, Bucheon-si (KR); Jong-bum Choi, Yongin-si (KR); Jae-hyun Kim, Seoul (KR); Jeong-hoon Park, Seoul (KR); Kyo-hyuk Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/394,786

(22) PCT Filed: Apr. 17, 2013

(86) PCT No.: PCT/KR2013/003230
§ 371 (c)(1),
(2) Date: Oct. 16, 2014

(87) PCT Pub. No.: WO2013/157839
PCT Pub. Date: Oct. 24, 2013

(65) Prior Publication Data
US 2015/0086124 A1   Mar. 26, 2015

Related U.S. Application Data

(60) Provisional application No. 61/625,377, filed on Apr. 17, 2012.

(51) Int. Cl.
*G06K 9/36* (2006.01)
*H04N 19/154* (2014.01)
(Continued)

(52) U.S. Cl.
CPC .......... *H04N 19/154* (2014.11); *H04N 19/117* (2014.11); *H04N 19/14* (2014.11);
(Continued)

(58) Field of Classification Search
CPC ...... H04N 7/50; H04N 7/30; H04N 7/26244; H04N 7/26313; H04N 7/26079; H04N 7/26563; H04N 7/26579; H04N 7/26393; H04N 7/2651; G06K 9/645; G06K 9/6202; G06K 9/03; G06K 9/20; G06K 9/32; G06T 9/007
See application file for complete search history.

(56) References Cited

U.S. PATENT DOCUMENTS

2007/0098078 A1   5/2007   Kim et al.
2011/0274158 A1   11/2011  Fu et al.
(Continued)

FOREIGN PATENT DOCUMENTS

JP   2011-223340 A   11/2011
KR   10-2007-0041523 A   5/2007
(Continued)

OTHER PUBLICATIONS

Kim et al., "Subjective Tests on ALF and SAO Using HM-4.0", ITU-T SG16 WP3 and ISO/IEC JTC1/SC29/WG11, Nov. 2011, 3 pages total, Geneva, CH.

(Continued)

*Primary Examiner* — Duy M Dang
(74) *Attorney, Agent, or Firm* — Sughrue Mion, PLLC

(57) ABSTRACT

A method of determining an offset includes dividing a current image into a plurality of blocks, determining a category of pixels in each of the plurality of blocks based on values of neighboring pixels, determining an offset value for pixels belonging to the category, and adjusting the offset value based on characteristics of the category and a background pixel value of each of the pixels. The offset value is an average of differences between values of original images and restored images of pixels belonging to one category. The background pixel value is an average of values of pixels in a background pixel block to which the pixels belong among background pixel blocks divided to calculate a background pixel value.

19 Claims, 10 Drawing Sheets

(51) Int. Cl.
  *H04N 19/176* (2014.01)
  *H04N 19/117* (2014.01)
  *H04N 19/14* (2014.01)
  *H04N 19/196* (2014.01)
  *H04N 19/61* (2014.01)
  *H04N 19/96* (2014.01)
  *H04N 19/86* (2014.01)

(52) U.S. Cl.
  CPC ......... *H04N 19/176* (2014.11); *H04N 19/198* (2014.11); *H04N 19/61* (2014.11); *H04N 19/86* (2014.11); *H04N 19/96* (2014.11)

(56) References Cited

U.S. PATENT DOCUMENTS

| | | | |
|---|---|---|---|
| 2012/0082244 | A1 | 4/2012 | Chen et al. |
| 2013/0156335 | A1 | 6/2013 | Lim et al. |
| 2014/0328413 | A1* | 11/2014 | Esenlik ............... H04N 19/197 375/240.29 |

FOREIGN PATENT DOCUMENTS

| | | |
|---|---|---|
| KR | 10-2012-0020262 A | 3/2012 |
| WO | 2012030193 A2 | 3/2012 |

OTHER PUBLICATIONS

Kim et al., "CE8 Subset c: Necessity of Sign Bits for SAO Offsets", ITU-T SG16 WP3 and ISO/IEC JTC1/SC29/WG11, Feb. 2012, 9 pages total, San José, CA, USA.

Chou et al., "A Perceptually Tuned Subband Image Coder Based on the Measure of Just-Noticeable-Distortion Profile", IEEE Trans. on CSVT, Dec. 6, 1995, 10 pages total, vol. 5, No. 6.

Bross et al., "WD5: Working Draft 5 of High-Efficiency Video Coding", ITU-T SG16 WP3 and ISO/IEC JTC1/SC29/WG11, Nov. 2011, 213 pages total, Geneva, CH.

Bross et al., "High efficiency video coding (HEVC) text specification draft 6", ITU-T SG16 WP3 and ISO/IEC JTC1/SC29/WG11, Nov. 2011, 259 pages total, Geneva, CH.

Bossen, "Common test conditions and software reference configurations", ITU-T SG16 WP3 and ISO/IEC JTC1/SC29/WG11, JCTVC-H1100, Feb. 2012, 3 pages total, San Jose, CA, USA.

Bossen, "Common test conditions and software reference configurations", ITU-T SG16 WP3 and ISO/IEC JTC1/SC29/WG11, Document JCTVC-G1200, Nov. 2011, 4 pages total, Geneva, CH.

Communication dated Aug. 23, 2013 issued by International Searching Authority in counterpart International Patent Application No. PCT/KR2013/003230.

* cited by examiner

METHOD AND APPARATUS FOR DETERMINING OFFSET VALUES USING HUMAN VISUAL CHARACTERISTICS

RELATED APPLICATIONS

This is a national stage application of PCT/KR2013/003230 filed on Apr. 17, 2013 which claims the benefit of U.S. Provisional Application 61/625,377 filed on Apr. 17, 2012, in the United States Patent and Trademark Office, the disclosures of which are hereby incorporated herein in their entirety by reference.

BACKGROUND

1. Field

Exemplary embodiments relate to a method and apparatus for determining an offset value using the human visual system and encoding or decoding an image based on the offset value.

2. Related Art

Among high efficiency video coding (HEVC) standards, sample adaptive offset (SAO) is a technique of improving both subjective image quality and the efficiency of coding by compensating for the difference between the original image and a restored image, which occurs during encoding of the image, by applying an offset value in units of pixels.

However, if SAO is applied to an image, when a negative or positive offset value is used for a current pixel having a value that is less than or greater than that of a neighboring pixel, the difference between the values of the current pixel and the neighboring pixel increases to cause salt noise to occur.

SUMMARY

Exemplary embodiments provide a method and apparatus for determining an offset value by using the human visual system and encoding or decoding an image based on the offset value.

According to an aspect of an exemplary embodiment, a method of determining an offset includes dividing a current image into a plurality of blocks; determining a category of pixels in each of the plurality of blocks, based on values of neighboring pixels; determining an offset value for pixels belonging to the category; and adjusting the offset value, based on characteristics of the category and a background pixel value of each of the pixels. The offset value is an average of the differences between values of original images and restored images of pixels belonging to one category, and the background pixel value is an average of values of pixels in a background pixel block to which the pixels belong among background pixel blocks divided to calculate a background pixel value.

The adjusting of the offset value may include detecting a background pixel value of a pixel corresponding to the offset value; and adjusting the offset value based on the detected background pixel value and characteristics of the category.

The detecting of the background pixel value may include detecting the background pixel value of the pixel corresponding to the offset value when the characteristics of the category correspond to a local minimum value or a local maximum value.

The adjusting of the offset value may include determining whether the background pixel value is within a visually sensitive region; and adjusting the offset value according to a result of determining whether the background pixel value is within the visually sensitive region.

During the adjusting of the offset value, the offset value may be adjusted to '0' when the characteristics of the category correspond to a local minimum value, the background pixel value is within a visually sensitive region, and the offset value is a negative value, and when the characteristics of the category correspond to a local maximum value, the background pixel value is within the visually sensitive region, and the offset value is a positive value.

During the adjusting of the offset value, the offset value may be adjusted to '0' when a value of a current pixel is equal to a value of a first neighboring pixel and less than a value of a second neighboring pixel, and the offset value is a negative value, and when the value of the current pixel is equal to the value of the first neighboring pixel and greater than the value of the second neighboring pixel, and the offset value is a positive value.

The method may further include determining a sample adaptive offset (SAO) type of each of the plurality of blocks using the adjusted offset value. The determining of the SAO type of each of the plurality of blocks may include detecting an offset value of each category for the SAO type of each of the plurality of blocks, and determining an optimum SAO type and a block division structure, considering the detected offset value and whether each of the plurality of blocks is divided.

The method may further include compensating for pixel values of the restored images in units of categories by using the offset value.

According to an aspect of an exemplary embodiment, if an offset value is applied to a value of a pixel, when the value of the pixel is determined to be less than or greater than a value of a neighboring pixel, the performance of compression performance and an encoding/decoding speed may be improved while effectively preventing salt noise from occurring by applying the offset value to a restored image based on the human visual system.

DETAILED DESCRIPTION OF EXEMPLARY EMBODIMENTS

Figure 1:
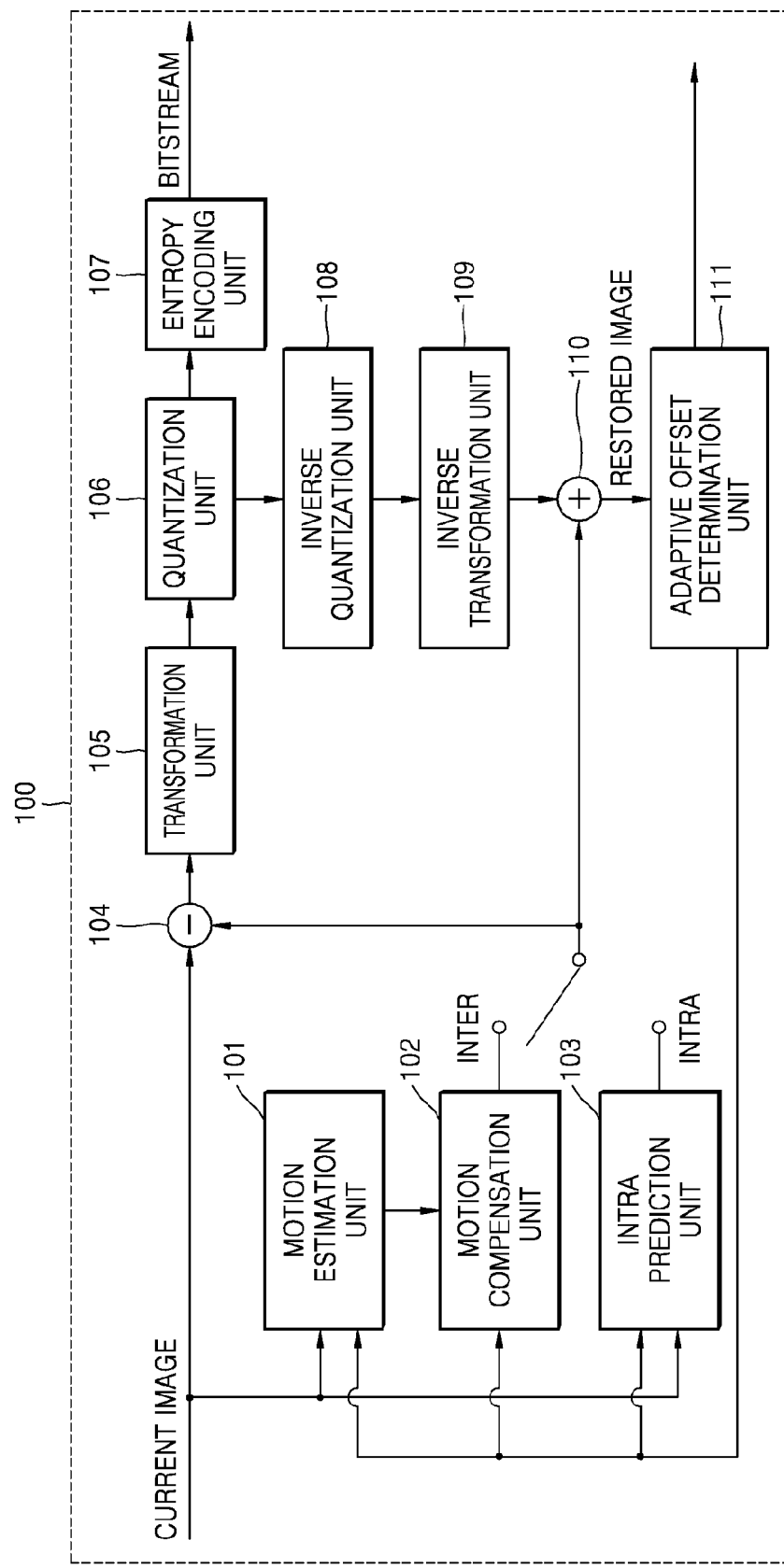
FIG. 1 is a block diagram of an internal structure of a video encoding apparatus according to an exemplary embodiment.

Hereinafter, exemplary embodiments will be described in detail with reference to the accompanying drawings. In the following disclosure and the accompanying drawings, well-known functions or constructions are not described and illustrated in detail if it is determined that they would obscure the exemplary embodiments due to unnecessary detail. Also, the same elements are denoted by the same reference numerals throughout the drawings, if possible.

The terms or expressions used in the present specification and the claims should not be construed as being limited to as generally understood or as defined in commonly used dictionaries, and should be understood according to the technical idea of the inventive concept, based on the principle that the inventor(s) of the application can appropriately define the terms or expressions to optimally explain the inventive concept. Accordingly, exemplary embodiments are to cover all modifications, equivalents, and alternatives falling within the scope of the inventive concept at the filing date of the present application.

The principle of the exemplary embodiments is applicable to coding standards based on any intra-frames/inter-frames. Throughout the present disclosure, the term 'image' has been used as a comprehensive term to cover not only the term 'image' itself but also other various shapes of video image information, such as a 'frame', a 'field', and a 'slice', which are known in the technical field to which the exemplary embodiments pertain.

Exemplary embodiments will now be described with reference to the accompanying drawings.

FIG. 1 is a block diagram of an internal structure of a video encoding apparatus 100 according to an exemplary embodiment.

Referring to FIG. 1, the video encoding apparatus 100 according to an exemplary embodiment may include a motion estimation unit 101 (e.g. a motion estimator, etc.), a motion compensation unit 102 (e.g. a motion compensator, etc.), an intra prediction unit 103 (e.g. an intra predictor, etc.), a subtractor 104, a transformation unit 105 (e.g. a transformer, etc.), a quantization unit 106 (e.g. a quantizer, etc.), an entropy encoding unit 107 (e.g. an entropy encoder, etc.), an inverse quantization unit 108 (e.g. an inverse quantizer, etc.), an inverse transformation unit 109 (e.g. an inverse transformer, etc.), an adder 110, and an adaptive offset determination unit 111 (e.g. an adaptive offset determiner, etc.).

The motion estimation unit 101 estimates the motion of an image that is currently being received (hereinafter referred to as the 'current image') among images that constitute video, based on at least one reference image among reference images restored using the adder 110. More specifically, the motion estimation unit 101 performs motion estimation on each of blocks corresponding to an inter mode among blocks of the current image. A block of a reference image that best matches an inter-mode block of the current image among reference images restored by a restoration unit 112 is determined, and a motion vector representing a displacement between the determined block of the reference image and a block of the current image is calculated.

The motion compensation unit 102 produces a predicted image of the current image from at least one reference image restored by the restoration unit 112. More specifically, the motion compensation unit 102 produces a predicted image of the current image by determining values of the blocks of the current image based on values of blocks of at least one reference image indicated by motion vectors for the blocks of the current image that are calculated by the motion estimation unit 101.

The intra prediction unit 103 produces a predicted image of the current image by predicting a value of a current block with respect to each of blocks corresponding to an intra mode among the blocks of the current image, based on a value of a block adjacent to the current block among the blocks of the current image that are restored using the adder 110.

The subtractor 104 subtracts the predicted image produced by the motion compensation unit 102 or the intra prediction unit 103 from the current image to produces a residual image between the current image and the predicted image.

The transformation unit 105 transforms the residual image produced by the subtractor 104 from a spatial domain to a frequency domain. For example, the transformation unit 105 may transform the residual image produced by the subtractor 104 from the spatial domain to the frequency domain by performing an integral transformation such as discrete hadamard transform (DHT), discrete cosine transform (DCT), or the like.

The quantization unit 106 quantizes results of transformation performed by the transformation unit 105. More specifically, the quantization unit 106 divides values, which are obtained by transforming the residual image by the transformation unit 105, by a quantization size and then approximates the dividing results to integers.

The entropy encoding unit 107 performs entropy coding on results of quantization performed by the quantization unit 106 to produce a bitstream. For example, the entropy encoding unit 107 may perform entropy coding on the results of quantization performed by the quantization unit 106 by using context-adaptive variable-length coding (CAVLC), context-adaptive binary arithmetic coding (CAVAC), or the like. In particular, the entropy encoding unit 107 may perform entropy coding not only on the results of quantization performed by the quantization unit 106 but also information needed to decode video, e.g., index information of a reference image used for inter prediction, motion vector information, location information of a neighboring block used for intra prediction, etc.

The inverse quantization unit 108 inversely quantizes the results of quantization performed by the quantization unit 106. More specifically, the inverse quantization unit 108 restores transformation coefficients by multiplying the integers obtained by the quantization unit 106 by a quantization size.

The inverse transformation unit 109 restores a residual image between the current image and the predicted image by transforming results of inverse quantization performed by the inverse quantization unit 108, i.e., the transformation coefficients, from the frequency domain to the spatial domain.

The adder 110 produces a restored image of the current image by adding the residual image, which is restored by the inverse transformation unit 109, to the predicted image produced by the motion compensation unit 102 or the intra prediction unit 103.

The adaptive offset determination unit 111 may encode an adaptive offset value that may be determined in units of pixels (hereinafter referred to as the "offset value"). The offset value may be used to compensate for an error occurring when the residual image of the current image is quantized. The offset value may be determined to be the average of the differences between the values of pixels of the current image belonging to the same category and the values of pixels of the restored image belonging to the same category. A category may be determined based on values of neighboring pixels of the current pixel. Since the category is a value that may be determined by the values of neighboring pixels of each pixel, only one offset value may be encoded for each category.

The offset value is a value that may be used for sample adaptive offset (SAO). The SAO is a technique of improving both subjective image quality and the efficiency of coding by compensating for the difference between the original image and a restored image, which may occur during an encoding process such as a quantization process, by using a pixel-based offset value.

Referring to Equation 1 below, an offset value may be defined as the average of errors between the original pixels $org_n$ and restored pixels $rec_n$ of N pixels. In this case, the N pixels may belong to the same category. Thus, the offset value may be determined for each category, and the same offset value may be applied to a restored image for each category. The determined offset value may be used to compensate for an error in the restored image $rec_n$ during a decoding process, as shown in Equation 2 below.

$$\text{offset} = \frac{\sum_{n=0}^{N-1} org_n - rec_n}{N}$$ [Equation 1]

$$rec'_n = rec_n + \text{offset}, \text{ where } n = 0, 1, \ldots, N-1$$ [Equation 2]

In the SAO, an error between the original image and a restored image is directly calculated and thus both subjective image quality and objective image quality may be secured. Also, a restored image obtained by compensating for the difference between the original image and the restored image may be used as a reference image, thereby improving the efficiency of coding. However, if the SAO is applied to an image, when a negative or positive offset value is applied to a current pixel having a value that is less than or greater than that of a neighboring pixel, the difference between the value of the current pixel and the value of the neighboring pixel is higher than when the negative or positive offset value is not applied, thereby causing salt noise to occur.

The adaptive offset determination unit 111 may adjust an offset value based on the human visual system to remove the salt noise that may occur when the offset is applied to a restored image.

If the characteristics of a category correspond to a minimum local value (i.e., a value of a current pixel is less than values of neighboring pixels) and a determined offset value is a negative value (first case) and the characteristics of the category correspond to a maximum local value (i.e., the value of the current pixel is greater than the values of the neighboring pixels) and the determined offset value is a positive value (second case), then when the offset value is applied to a restored image, the differences between the value of the current pixel and the values of the neighboring pixels increase. Thus, the salt noise may occur in the restored image to which the offset value is applied. In this case, the salt noise may be prevented from occurring by adjusting the offset value to '0' so that the differences between the value of the current pixel and the values of the neighboring pixels may not increase. However, when the offset value is not applied by forcibly adjusting the offset value to '0', an error in the restored image cannot be compensated for and a compression rate may be thus lowered.

Thus, in order to remove the salt noise, the adaptive offset determination unit 111 may determine whether a background pixel value of a pixel is within a visually sensitive region. When the background pixel value is within the visually sensitive region, the difference between the values of the current pixel and a neighboring pixel, which may be recognized as the salt noise, is relatively low and thus the offset value may be adjusted to '0' so that the difference between the values of the current pixel and the neighboring pixel may not increase. When the background pixel value of the pixel is not within the visually sensitive region, the difference between the values of the current pixel and the neighboring pixel, which may be recognized as the salt noise, is relatively high and the offset may not be thus adjusted.

According to an exemplary embodiment, whether a current pixel is within the visually sensitive region may be determined based on the background pixel value of the pixel. Thus, even if an offset value increases the difference between the values of the current pixel and the neighboring pixel, the offset value may be applied to a region that is not sensitive to the salt noise. Accordingly, it is possible to prevent the occurrence of the salt noise that may occur due to the application of the offset value and to minimize degradation in the efficiency of coding, caused when the offset value is not applied.

Figure 2:
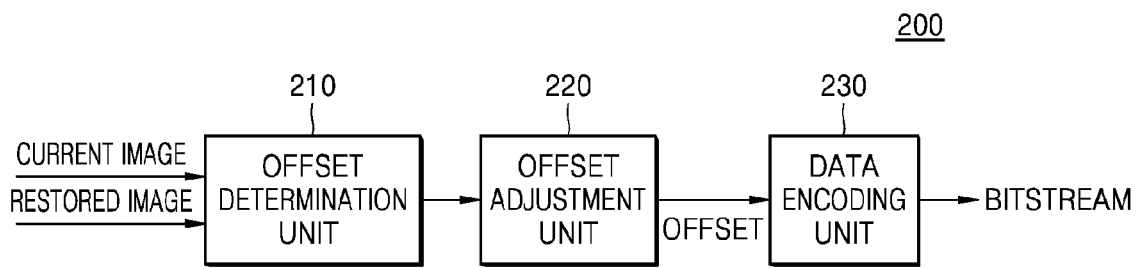
FIG. 2 is a block diagram of an internal structure of an adaptive offset determination unit according to an exemplary embodiment.

FIG. 2 is a block diagram of an internal structure of an adaptive offset determination unit 200 according to an exemplary embodiment. The adaptive offset determination unit 200 of FIG. 2 corresponds to the adaptive offset determination unit 111 of FIG. 1. Thus, a description of the adaptive offset determination unit 200 that is the same as that of the adaptive offset determination unit 111 is not redundantly described here.

Referring to FIG. 2, the adaptive offset determination unit 200 may include an offset determination unit 210 (e.g., an offset determiner, etc.), an offset adjustment unit 220 (e.g., an offset adjuster), and a data encoding unit 230 (e.g., a data encoder, etc.).

The offset determination unit 210 may determine an offset value for each of blocks, which are divided from a current image, according to a category thereof. According to an exemplary embodiment, a block division structure is not limited and may be determined according to various methods. A category may be determined based on values of neighboring pixels of a current pixel, but is not limited thereto and may be determined only using a value of the current pixel. Categories may be classified according to the differences between values of the current pixel and neighboring pixels, as will be described in more detail with reference to FIG. 6 below. The offset determination unit 210 may determine the category of each of pixels belonging to a block, and determine an offset value using the values of pixels belonging to the same category according to Equation 1. Thus, an offset value may be determined for each of categories.

The offset adjustment component 220 may adjust the offset value determined by the offset determination unit 210, based on the characteristics of a category and background pixel value of a pixel.

The data encoding unit 230 may encode the offset value, which is adjusted by the offset adjustment unit 220, into a bitstream. The data encoding unit 230 may perform entropy coding using CAVLC, CAVAC, etc., similar to the entropy encoding unit 107. The adaptive offset determination unit 200 may not include the data encoding unit 230, and encode the offset value by transmitting the adjusted offset value as video decoding information to the entropy encoding unit 107 so that the offset value may be encoded by the encoding unit 107.

Figure 3:
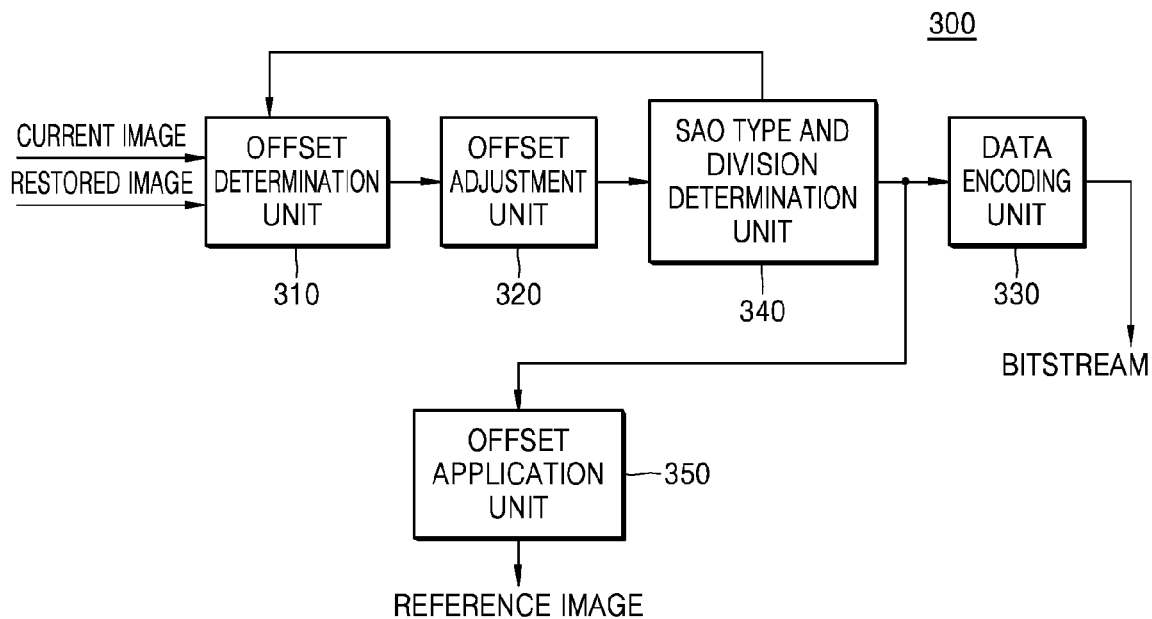
FIG. 3 is a block diagram of an internal structure of an adaptive offset determination unit according to another exemplary embodiment.

FIG. 3 is a block diagram of an internal structure of an adaptive offset determination unit 300 according to another exemplary embodiment. The adaptive offset determination unit 300 of FIG. 3 corresponds to the adaptive offset determination unit 111 of FIG. 1 and thus a description of the adaptive offset determination unit 300 that is the same as that of adaptive offset determination unit 111 is not redundantly described here. Also, an offset determination unit 310, an offset adjustment unit 320, and a data encoding unit 330 of FIG. 3 correspond to the offset determination unit 210, the offset adjustment unit 220, and the data encoding unit 230 of FIG. 2 and thus descriptions of the offset determination unit 310, the offset adjustment unit 320, and descriptions of the data encoding unit 330 that are the same as those of the offset determination unit 210, the offset adjustment unit 220, and the data encoding unit 230 are not redundantly described here.

Referring to FIG. 3, the adaptive offset determination unit 300 may include not only the offset determination unit 310, the offset adjustment unit 320, and the data encoding unit 330 but also an SAO type and division determination unit 340 (e.g., an SAO type and division determiner, etc.) and an offset application unit 350 (e.g., an offset applier, etc.). Also, the adaptive offset determination unit 300 may determine a block division structure for achieving an optimum efficiency of coding and a SAO type of each block by using an offset value. SAO types may be classified according to relative positions of neighboring pixels that may be referred to determine a category based on the values of the neighboring pixels. Since the adaptive offset determination unit 300 may further include the offset application unit 350, a reference image in which an error occurring in a quantization process is compensated for may be used to produce a predicted image.

In general, errors occurring in the quantization process may vary according to the precision of prediction. For example, errors hardly occur in a block that is accurately predicted in the quantization process, whereas residual signals occur frequently in a block that is inaccurately predicted and many errors may occur in the quantization process. Thus, according to the SAO, an offset value may be determined according to a block-based adaptive structure that enables an optimum SAO type to be applied to each of blocks. Similar to a quad tree-based code unit (CU) division method, a largest CU (LCU) block may be divided into sub-blocks to a 4-depth or less, and different SAO types may be applied to the sub-blocks. Pixels present in a block may be classified in units of categories based on SAO types, and an offset value may be determined for each of the categories.

According to another exemplary embodiment, the adaptive offset determination unit 300 may determine a block division structure and a SAO type that are optimum in terms of the efficiency of coding, encode information regarding the determined block division structure and SAO type, and transmit a result of encoding the information to a video decoding apparatus. As information regarding the block division structure, information sao_split_flag representing whether a block is divided into sub-blocks and information sao_type_idx representing a SAO type applied to each of the sub-blocks may be additionally transmitted. The information sao_split_flag may have a value of '1' when the block is divided into sub-blocks, and have a value of '0' when the block is not divided into sub-blocks. The block may include sub-blocks when the information sao_split_flag thereof has the value of '1'.

The SAO type that is applicable to blocks may be classified into a non-SAO type, an edge offset (EO) type, and a band offset (BO) type. The EO type may be classified into four EO types, based on relative positions of neighboring pixels with respect to a current pixel. According to the EO type, the adaptive offset determination unit 300 may classify categories of desired pixels, based on the relationship among the relative sizes of the values of a current pixel and neighboring pixels, and apply different offsets according to the classified categories. In the case of the BO type, categories may be classified according to values of pixels, and an offset value may be determined and encoded for each of the categories. In the case of the non-SAO type, an offset value is not applied and an offset value for a block of the non-SAO type may not be thus determined.

The offset determination unit 310 may determine an offset value according to a category for the SAO type of each of sub-blocks divided from a block, and transmit the offset value to the offset adjustment unit 320. The offset determination unit 310 may determine an offset value according to a category for the SAO type of each block to determine a block division structure and a SAO type of each block. The determined offset value may be adjusted by the offset adjustment unit 320, and used for the SAO type and division determination unit 340 to determine a block division structure and a SAO type of each block. For example, the offset determination unit 310 may determine an offset value according to a category for the SAO type of each of sub-blocks divided from a block and blocks subdivided from the sub-blocks. When the efficiency of coding the subdivided blocks is higher than that of coding the divided blocks, the offset determination unit 310 may receive a request to transmit offset values for blocks subdivided from the sub-divided blocks from the SAO type and division determination unit 340. The offset determination unit 310 may determine an offset value according to a category for the SAO type of each of the blocks subdivided from the sub-blocks, and transmit the offset value adjusted by the offset adjustment unit 320 to the SAO type and division determination unit 340.

The offset adjustment unit 320 may adjust an offset value based on the characteristics of a category and a background pixel value. In another exemplary embodiment, the SAO type of an offset value that is adjustable may be the EO type.

The SAO type and division determination unit 340 may determine a SAO type and a block division structure of each block based on the offset value for each block according to a category by using the offset adjustment unit 320. For example, in order to determine an offset value for one of a plurality of LCUs divided from an image, the SAO type and division determination unit 340 may determine a SAO type for achieving an optimum efficiency of coding a current block, based on offset values determined according to categories for SAO types of the LCU block. The SAO type and division determination unit 340 may determine a SAO type for achieving an optimum efficiency of coding the blocks divided from the LCU block, based on the offset values determined according to categories for the SAO types applicable to the respective blocks divided from the LCU block. The offset values may be provided from the offset adjustment unit 320. In addition, the SAO type and division determination unit 340 may determine a block division structure for achieving an optimum efficiency of coding, based on the offset value according to the determined SAO type of the LCU block and the offset values according to the determined SAO types of the blocks divided from the LCU block.

That is, when the efficiency of coding the LCU block is optimum, the SAO type and division determination unit 340 may finally determine the determined SAO type of the LCU block as a SAO type of the LCU block, and determine a block division structure and a SAO type for each of the other LCU blocks according to the method described above. However, when the efficiency of coding the blocks divided from the LCU block is optimum, the SAO type and division determination unit 340 may sub-divide the blocks similar to the LCU block by using the offset values according to the SAO types of the blocks divided from the LCU block. The SAO type and division determination unit 340 may determine a SAO type for achieving an optimum efficiency of coding for each of blocks subdivided from the blocks, and determine a block division structure for achieving an optimum efficiency of coding by using an offset value. When it is determined that the structure of the blocks subdivided from the blocks has an optimum efficiency of coding, the SAO type and division determination unit 340 subdivides the blocks subdivided from the blocks again and search for a block division structure for achieving an optimum efficiency of coding. The SAO type and division structure determination unit 340 may request the offset determination unit 310 to provide offset values of the blocks subdivided from the blocks subdivided from the blocks and receive the offset values from the offset adjustment unit 320. A number of times that a block divided from a block is subdivided to search for a block division structure may be limited to a predetermined number of times, e.g., four times.

The offset application unit 350 (e.g., an offset applier, etc.) may produce a reference image by applying an offset value according to the SAO type and the block division structure of each block, which are finally determined by the SAO type and division determination unit 340, to a restored image. The reference image may be used for a video encoding apparatus to produce a residual image that is the difference between a current image and a reference image. A video encoding apparatus according to another exemplary embodiment may perform encoding using a reference image in which an error occurring in a quantization process is compensated for, thereby greatly improving the efficiency of coding.

Figure 4:
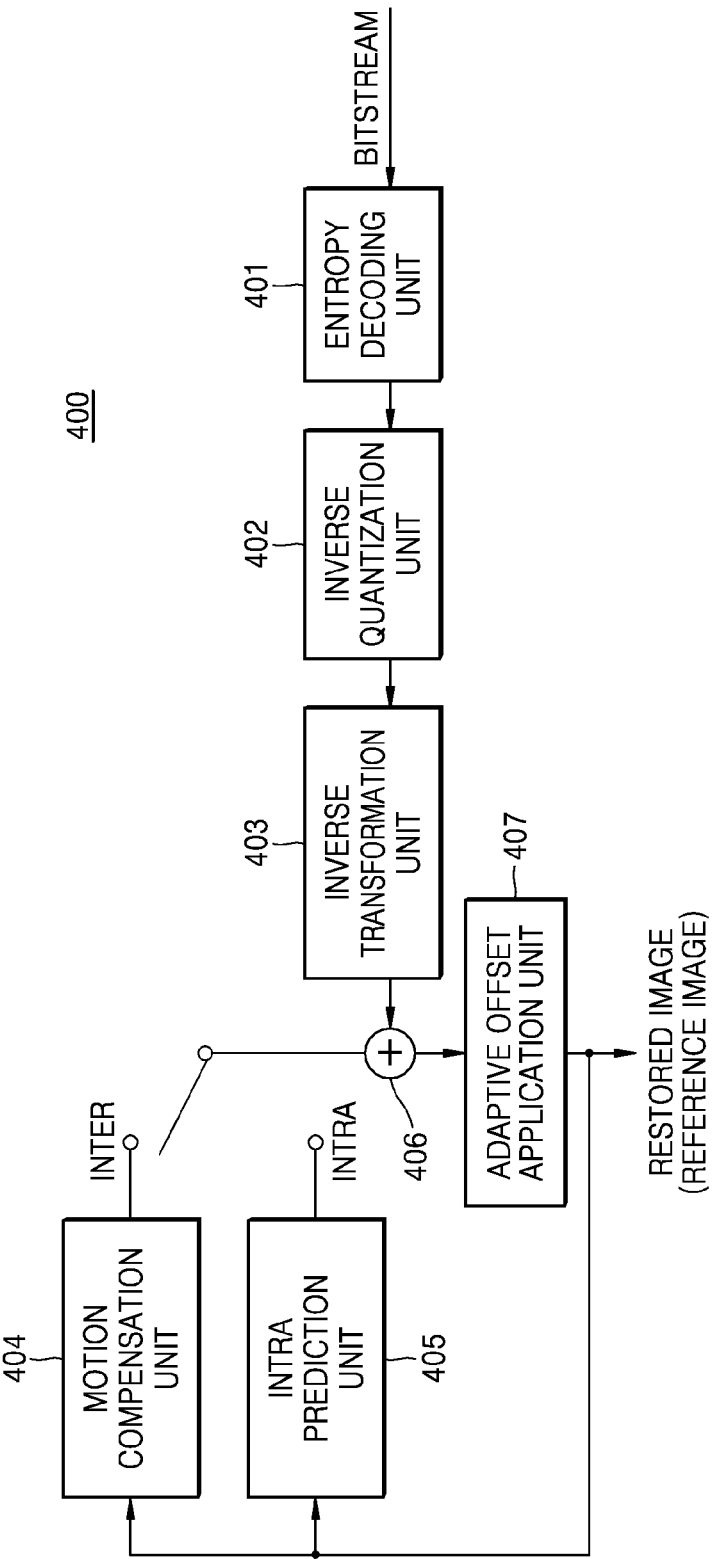
FIG. 4 is a block diagram of an internal structure of a video decoding apparatus according to an exemplary embodiment.

FIG. 4 is a block diagram of an internal structure of a video decoding apparatus 400 according to an exemplary embodiment.

Referring to FIG. 4, the video decoding apparatus 400 according to an exemplary embodiment may include an entropy decoding unit 401 (e.g., an entropy decoder, etc.), an inverse quantization unit 402, an inverse transformation unit 403, a motion compensation unit 404, an intra prediction unit 405, an adder 406, and an adaptive offset application unit 407 (e.g., an adaptive offset applier). An image restoring process may be performed by the video decoding apparatus 400 of FIG. 4 similar to an image restoring process performed by the video encoding apparatus 100 of FIG. 1. Thus, although not described here, the above description of the video encoding apparatus 100 of FIG. 1 is applicable to the video decoding apparatus 400 according to the current embodiment.

The entropy decoding unit 401 restores integers corresponding to video and information needed to decode the video by entropy-decoding a bitstream output from the video encoding apparatus 100 of FIG. 1.

The inverse quantization unit 402 inversely quantizes the integers restored by the entropy decoding unit 401 to restore transformation coefficients.

The inverse transformation unit 403 restores a residual image between a current image and a predicted image by transforming the transformation coefficients restored by the inverse quantization unit 402 from a frequency domain to a spatial domain.

The motion compensation unit 404 may produce a predicted image of the current image from at least one among reference images produced by the adaptive offset application unit 407.

The intra prediction unit 405 produces a predicted image of the current image by predicting values of the blocks of the current image from values of restored blocks adjacent to the blocks of the current image among blocks of an image restored from blocks corresponding to an intra mode by the adaptive offset application unit 407 among the blocks that constitute the current image.

The adder 406 produces a restored image of the current image by adding the residual image restored by the inverse transformation unit 403 to the predicted image produced by the motion compensation unit 404 or the intra prediction unit 405.

The adaptive offset application unit 407 may produce a restored image to which an offset value is applied by applying an offset value to the restored image, which is produced by the adder 406, according to a category. According to another exemplary embodiment, the adaptive offset application unit 407 may further use a block division structure and SAO type information to apply the offset value to the restored image. The information regarding the block division structure, the SAO type information, the offset value according to a category may be obtained by decoding a bitstream by the entropy decoding unit 401.

The produced restored images may be transmitted to the motion compensation unit 404 and the intra prediction unit 405 to be used as reference images for producing a restored image. According to an exemplary embodiment, an error between a current image and a restored image that may occur during an encoding process may be compensated for by applying an offset value to the restored image, thereby improving the efficiency of coding.

Figure 5:
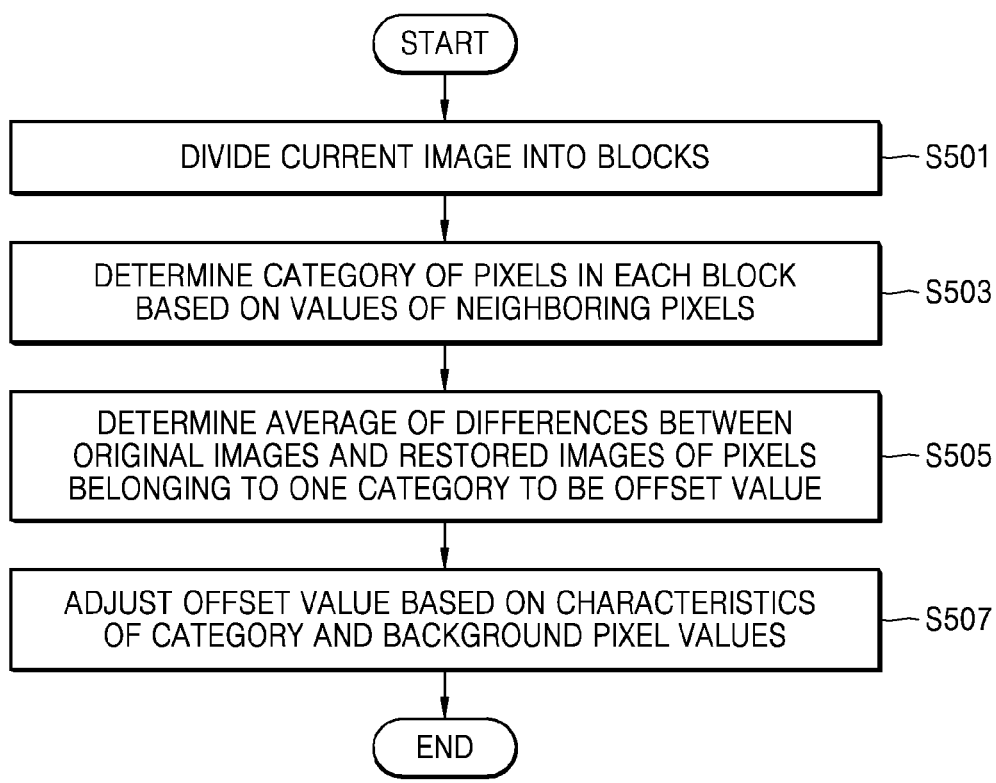
FIGS. 5 and 6 are flowcharts of methods of determining an offset value according to an exemplary embodiment.

FIG. 5 is a flowchart of a method of determining an offset value according to an exemplary embodiment.

Referring to FIG. 5, in operation S501, the adaptive offset determination unit 111 may divide a current image into a plurality of blocks to determine an offset value for the current image. In this case, the current image may be divided into a plurality of blocks similar to a block division method employed in an image encoding process, but is not limited thereto and may be divided according to various methods.

In operation S503, the adaptive offset determination unit 111 may determine a category of pixels present in each of the blocks. The categories may be determined by comparing the values of neighboring pixels adjacent to blocks of the current image with that of a current pixel. According to an exemplary embodiment, the category may be determined based on the relationship among the relative sizes of the values of the neighboring pixels and the current pixel. In the case of pixels belonging to a category including a current pixel having a value that is less than or greater than the values of neighboring pixels, the salt noise may occur since the differences between the values of the current pixel and the neighboring pixels may increase when an offset value is applied to a restored image. Thus, according to an exemplary embodiment, an offset value for a category in which the salt noise may occur may be adjusted based on the human visual system.

In operation S505, the adaptive offset determination unit 111 may determine the average of the differences between the values of the original images and restored images of pixels belonging to one category to be an offset value for the category. The offset value may be adjusted and then applied to the pixels belonging to the category of the restored image.

In operation S507, the adaptive offset determination unit 111 may adjust the offset value based on the characteristics of the category and background pixel values of the pixels. As described above, an offset value for a category in which the salt noise may occur may be adjusted based on whether background pixel values of the pixels are within a sensitive region. A background pixel value of a background pixel block among background pixel blocks of an image may be determined to be the average of the values of pixels belonging to the background pixel block. The background pixel block may be divided independently from the block division method performed in operation S501.

An offset value may be adjusted in units of the pixels, based on whether the background pixel values of the pixels are within the sensitive region. In this case, in a background pixel block to which each of the pixels belongs, the average of the values of the pixels belonging to the background pixel block may be determined as a background pixel value.

When the background pixel value is within a visually sensitive region, the difference between the values of a current pixel and neighboring pixels that may be recognized as the salt noise is small. Thus, the offset value may be adjusted to '0' so that the difference between the values of the current pixel and the neighboring pixels may not increase. When the background pixel value is not within the visually sensitive region pixel, the difference between the values of the current pixel and the neighboring pixels that may be recognized as the salt noise is relatively large and the offset value determined in operation S505 may not be adjusted.

Figure 6:
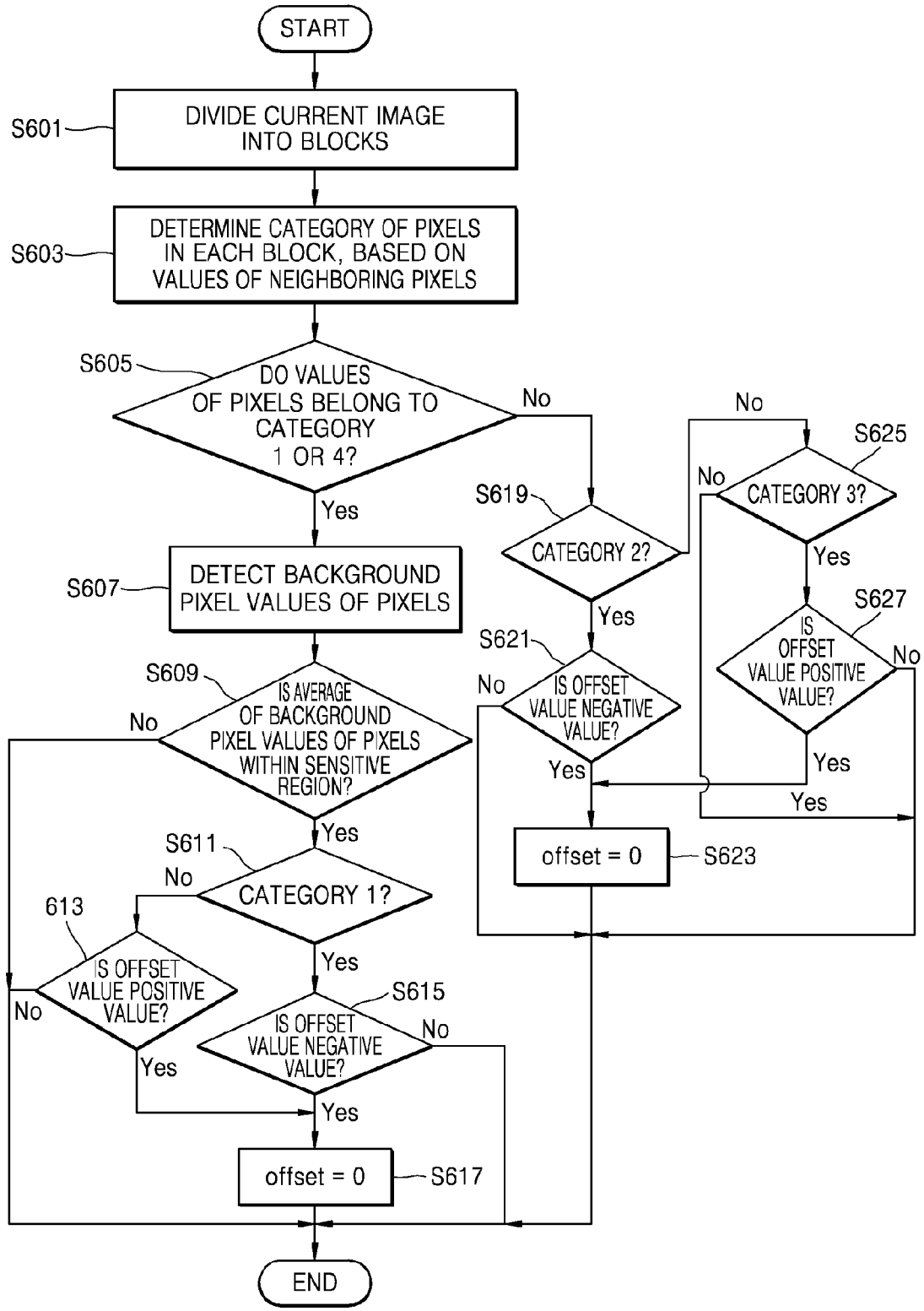

FIG. 6 is a flowchart of a method of determining an offset value according to another exemplary embodiment.

In FIG. 6, operations S601 and S603 correspond to operations S501 and operation S503 of FIG. 5 and are not described again here.

Referring to FIG. 6, in operation S601, the adaptive offset determination unit 111 may divide a current image into a plurality of blocks to determine an offset value for the current image.

Figure 10:
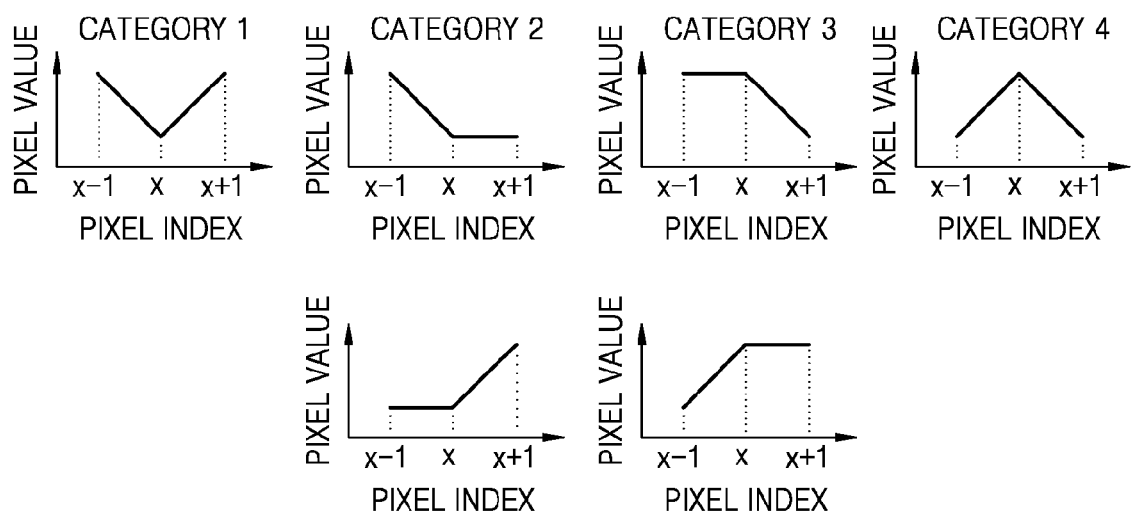
FIG. 10 is a diagram illustrating examples of a determined category of a pixel according to an exemplary embodiment.

In operation S603, the adaptive offset determination unit 111 may determine a category of pixels present in each of the blocks, based on values of neighboring pixels of the respective pixels. The number of the categories determined in operation S603 may be five. In category 1, the value of a current pixel is less than those of neighboring pixels. In category 2, the value of a first neighboring pixel is equal to that of the current pixel but the value of a second neighboring pixel is less than that of the current pixel. In category 3, the value of the first neighboring pixel is equal to that of the current pixel but the value of the second neighboring pixel is greater than that of the current pixel. In category 4, the value of the current pixel is greater than those of the neighboring pixels. The values of the pixels of categories 1 to 4 may be indicated as illustrated in the graph of FIG. 10. Pixels that do not belong to categories 1 to 4 may belong to category 0. An offset value may not be determined for category 0.

In operation S605, the adaptive offset determination unit 111 determines whether the values of pixels belong to category 1 or 4. In operation S607, background pixel values of the pixels belonging to category 1 or 4 may be detected. As described above, a background pixel value of a background pixel block among background pixel blocks of an image may be determined to be the average of the values of pixels belonging to the background pixel block. Offset values for category 1 or 4 may be adjusted based on whether the average of background pixel values of pixels belonging to the same category is within a sensitive region. Otherwise, an offset value may be adjusted in units of pixels, based on whether a background pixel value of each of the pixels is within the sensitive region. A case in which an offset value is adjusted in units of categories will be described below.

In operation S609, the adaptive offset determination unit 111 may determine whether the average of background pixel values of pixels belonging to the same category is within the sensitive region, and adjust an offset value for each of the categories based on whether the offset value for category 1 or 4 is a negative value or a positive value when the average of the background pixel values is within the sensitive region.

In operation S617, when it is determined in operations S611 and S615 that the offset value for category 1 is a negative value, the adaptive offset determination unit 111 may adjust the offset value to '0'. Since the differences between the values of the pixels belonging to category 1 and neighboring pixels increase when a negative offset value is applied to the pixels belonging to category 1, the salt noise may occur in a restored image to which the offset is applied. Thus, the adaptive offset determination unit 111 may prevent the salt noise from occurring by adjusting the offset value for background pixel values that are within a visually sensitive region to '0'.

In operation S617, when it is determined in operations S611 and S613 that the offset value for category 4 is a positive value, the adaptive offset determination unit 111 may adjust the offset value to '0'. Since the differences between the values of the pixels belonging to category 4 and neighboring pixels increase when a positive offset value is applied to the pixels belonging to category 4, the salt noise may occur in a restored image to which the offset is applied. Thus, the adaptive offset determination unit 111 may prevent the salt noise from occurring by adjusting the offset value for background pixel values that are within the visually sensitive region to '0'.

When the averages of background pixel values of the other categories are not within the visually sensitive region, the salt noise is difficult to recognize and the adaptive offset determination unit 111 may not thus perform offset value adjustment. Also, when the offset value for category 1 is a positive value including '0' or the offset value for category 4 is a negative value including '0', the difference between the values of a current pixel and a neighboring pixel does not increase when the offset value is applied and the adaptive offset determination unit 111 may not thus adjust the offset value.

In operations S619 to S623, the adaptive offset determination unit 111 may adjust an offset value without considering a background pixel value of a category. This is because pixels belonging to categories 2 and 3 are generally present in an edge region and may be thus seriously distorted when the values of the pixels are arbitrarily changed. In contrast, the pixels belonging to categories 1 and 4 are generally present in a fabric or texture region and may not be thus seriously distorted when the values of the pixels are changed, unlike in the edge region. Thus, according to an exemplary embodiment, offset values for the pixels belonging to categories 1 and 4 may be adjusted based on background pixel values. However, when an offset value for category 2 is a negative value or an offset value for category 3 is a positive value, the offset value may be adjusted to '0' since the salt noise may occur when the offset value is applied.

Thus, in operation S623, when it is determined in operations S619 and S621 that the offset value for category 2 is a negative value, the adaptive offset determination unit 111 may adjust the offset value to '0'. In operation S623, when it is determined in operations S625 and S627 that the offset value for category 3 is a positive value, the adaptive offset determination unit 111 may adjust the offset value to '0'.

Furthermore, when it is determined in operation S621 or S627 that the offset value for category 2 is a positive value including '0' or the offset value for category 3 is a negative value including '0', the difference between the values of the current pixel and a neighboring pixel does not increase when the offset value is applied and the offset value may not be adjusted. Since an offset value is not applied to pixels belonging to category 0 in which no offset value is applied, offset value adjustment may not be adjusted.

Figure 7:
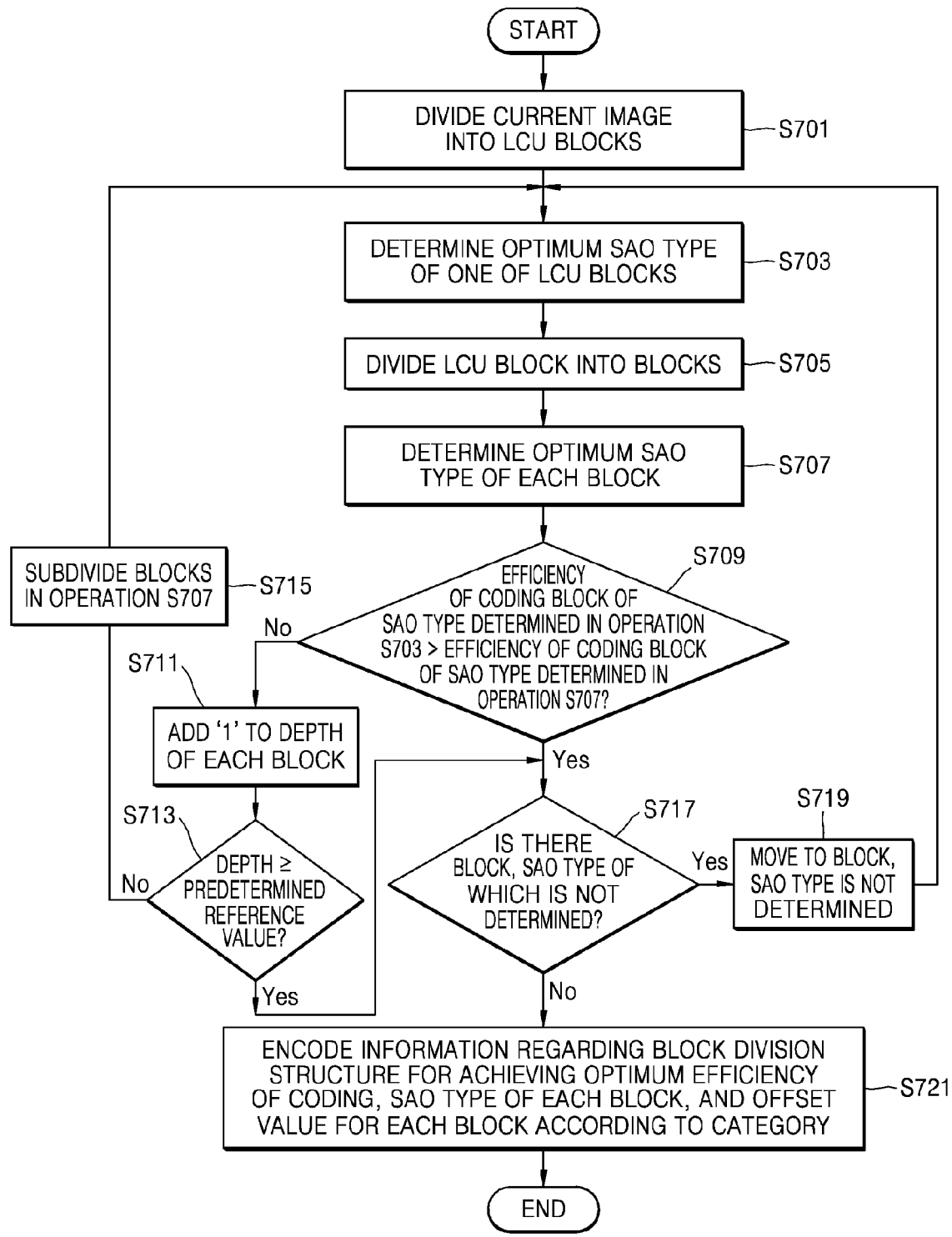
FIG. 7 is a flowchart of a method of determining an offset value according to another exemplary embodiment.

FIG. 7 is a flowchart of a method of determining an offset value according to another exemplary embodiment.

Referring to FIG. 7, in operation S701, the adaptive offset determination unit 111 may divide a current image into plurality of LCU blocks. The LCU blocks may be divided independently of whether a code unit (CU) block is divided to encode an image.

In operation S703, the adaptive offset determination unit 111 may determine a SAO type of one of the LCU blocks for achieving an optimum efficiency of coding, based on an offset value determined in units of categories for each of SAO types of the LCU block.

In operations S705 and S707, the adaptive offset determination unit 111 may divide the LCU block into blocks, and determine a SAO type of each of the blocks for achieving an optimum efficiency of coding, based on an offset value determined in units of categories for each of SAO types of the respective blocks.

In operation S709, the adaptive offset determination unit 111 may compare the efficiency of coding one of the LCU blocks according to the SAO type determined in operation S703 with the efficiency of coding the blocks according to the SAO type determined in operation S707. The efficiency of coding blocks determined according to the SAO type determined in operation S703 or S707 may be achieved based on the offset values determined in units of the categories classified according to the SAO type.

In operation S717, when the efficiency of coding a block according to the SAO type determined in operation S703 is higher than that determined in operation S707, the adaptive offset determination unit 111 may determine whether there is a block, the SAO type of which is not determined. When a block, the SAO type of which is not determined is present, operations S703 to 717 may be repeatedly performed on this block (operation S719). When a block, the SAO type of which is not determined is not present, it is determined that the SAO types of all of the blocks are determined. Then, in operation S721, information regarding a block division structure for achieving an optimum efficiency of coding, the SAO type of each of the blocks, and the offset value for each of the blocks according to the category may be encoded.

In operation S715, when the efficiency of coding a block according to the SAO type determined in operation S707 is higher than that determined in operation S703, the blocks divided from the LCU block in operation S705 may be subdivided into sub-blocks. Then, operations S703 to S717 may be repeatedly performed on the sub-blocks. However, before operation S715 is performed, it may be determined whether the depth of each of the blocks is equal to or greater than a predetermined reference value so that block division may not be performed endlessly. The depth of each of the blocks means a number of times that each of the blocks is divided. The depth of LCU blocks that are first divided from an image may be '0' and the depth of blocks divided from each of the LCU blocks may be '1'. Thus, in operation S711, when it is determined in operation S709 that the efficiency of coding the blocks is higher than the efficiency of coding one of the LCU blocks, '1' is added to the depth of each of the blocks. Then, in operation S713, it may be determined whether the depth of each of the blocks is equal to or greater than the predetermined reference value. When the depth of each of the blocks is equal to or greater than the predetermined reference value, each of the blocks is not divided any further and operations S703 to S719 may be repeatedly performed on a block, the SAO type of which is not determined.

Figure 8:
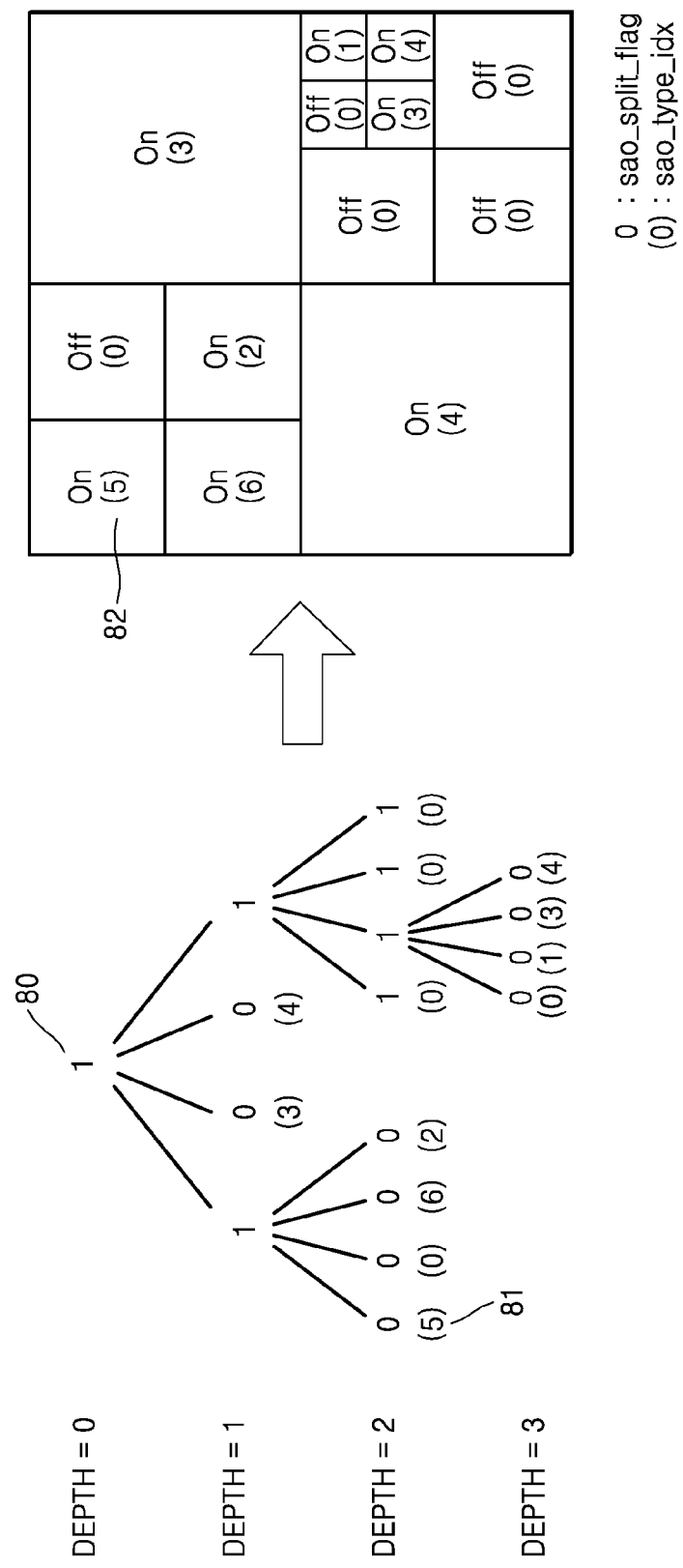
FIG. 8 is a diagram illustrating a method of dividing an image into a plurality of blocks according to an exemplary embodiment.

FIG. 8 is a diagram illustrating a method of dividing an image into a plurality of blocks according to an exemplary embodiment.

Referring to FIG. 8, an LCU block of an image may be divided into blocks to a depth of 4 or less, similar to the quad tree-based CU division method. Based on whether each of the sub-blocks is divided into sub-blocks, information sao_split_flag 80 of each of the blocks may have a value of '0' or '1'. The information sao_split_flag 80 of a block that is not divided into sub-blocks may be '0' and the information sao_split_flag 80 of a block that is divided into sub-blocks may have a value of '1'.

In FIG. 8, information sao_type_idx 81 and information sao_type_idx 82 represent SAO types of the blocks. The information sao_type_idx 81 and the information sao_type_idx 82 may be assigned to blocks that are not divided into sub-blocks. The values of the information sao_type_idx 81 and the information sao_type_idx 82 sao_type_idx may be integers, e.g., 0, 1, 2, 3, 4, etc. These integers may correspond to various SAO types, respectively.

However, according to an exemplary embodiment, block division performed to determine an offset value of an image is not limited thereto and may be performed according to various methods.

Figure 9:
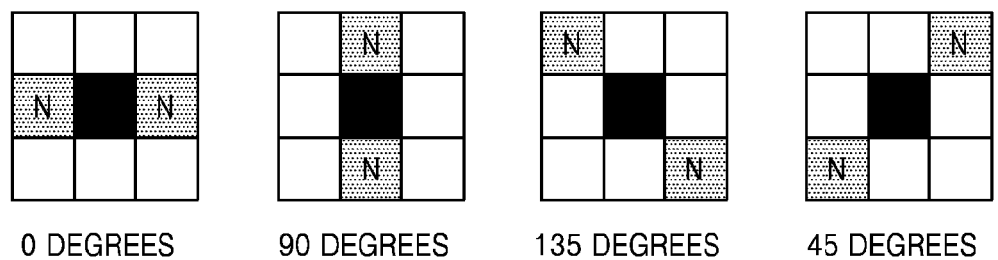
FIG. 9 is a diagram illustrating a method of determining a category of a pixel based on values of neighboring pixels according to another exemplary embodiment.

FIG. 9 is a diagram illustrating a method of determining a category of a pixel based on values of neighboring pixels according to another exemplary embodiment.

Referring to FIG. 9, a SAO type may be determined according to the locations of neighboring pixels N to be referred to determine a category of a pixel C. The SAO type may be classified into four EO types, e.g., 0 degrees, 90 degrees, 135 degrees, and 45 degrees, based on the locations of the neighboring pixels N and the pixel C. Thus, the SAO types of the blocks in FIG. 7 may be determined to be SAO types including the four EO types. In another exemplary embodiment, a SAO type may include not only an EO type but also a BO type and a non-SAO type. When the SAO type is determined, a category may be determined according to the determined SAO type. When the determined SAO type is one of EO types, the locations of neighboring pixels to be referred to determine the category may be determined based on the determined EO type. A category of each of pixels may be determined based on the relationship among the relative sizes of the values of a current pixel and neighboring pixels present on the determined locations.

FIG. 10 is a diagram illustrating examples of a determined category of a pixel according to an exemplary embodiment.

In an exemplary embodiment, the number of categories to be determined is five. In detail, category 1 shows a graph of a concave type in which the value of a current pixel having a pixel index x is less than those of a neighboring pixel having a pixel index x−1 and a neighboring pixel having a pixel index x+1. Category 2 shows a graph of a concave edge type in which the value of the current pixel is less than or equal to those of the neighboring pixels. Category 3 shows a graph of a convex edge type in which the value of the current pixel is equal to or greater than those of the neighboring pixels. Category 4 shows a graph of a concave type in which the value of the current pixel is greater than those of the neighboring pixels. Pixels that do not belong to categories 1 to 4 may belong to category 0 (not shown). No offset value may be determined for category 0.

Figure 11:
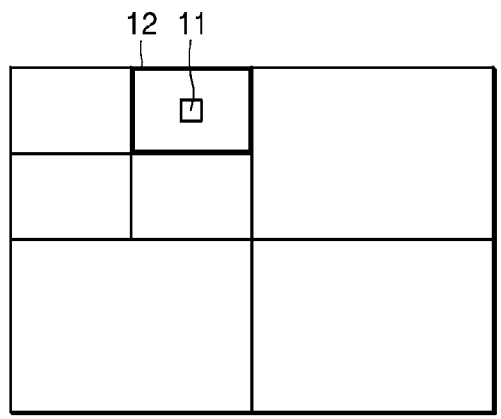
FIG. 11 is a diagram illustrating a method of detecting a background pixel value of a pixel according to an exemplary embodiment.

FIG. 11 is a diagram illustrating a method of detecting a background pixel value of a pixel according to an exemplary embodiment.

Referring to FIG. 11, the average of the values of pixels present in a background pixel block 12 to which a current pixel 11 belongs among background pixel blocks divided to detect a background pixel value may be determined to be a background pixel value of the current pixel 11.

The adaptive offset determination unit 111 may adjust an offset value in units of categories, based on the average of background pixel values of pixels belonging to the same category, or adjust an offset value to be applied to each pixel in units of pixels, based on a background pixel value of each pixel.

Figure 12:
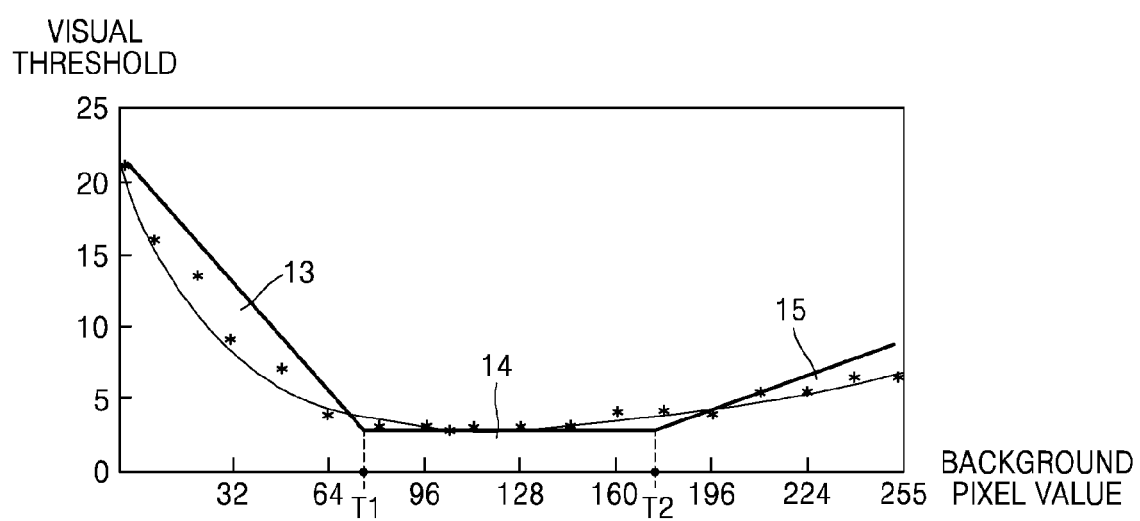
FIG. 12 is a graph of a distribution of background pixel values according to an exemplary embodiment.

FIG. 12 is a graph of a distribution of background pixel values according to an exemplary embodiment.

The graph of FIG. 12 shows the differences between the values of a current pixel and neighboring pixels that cause the current pixel to be visually differentiated from the neighboring pixels based on background pixel values. Referring to the graph of FIG. 12, when a background pixel value is within a region 14 between a point T1 and a point T2, the differences between the values of the current pixel and the neighboring pixels that cause the current pixel to be visually differentiated from the neighboring pixels are remarkably less than those in other regions 13 and 15. That is, when a background pixel value is within the region 14 between the points T1 and T2, the differences between the values of the current pixel and the neighboring pixels are low but are likely to cause the value of the current pixel to be visually differentiated from those of the neighboring pixels. Thus, the salt noise is likely to occur in the region 14 since a variation in pixel values can be easily recognized in the region 14 and the adaptive offset determination unit 111 may thus adjust offset values for pixels present in the region 14 to '0' so as to remove the salt noise. In the other region 13 or 15, the value of the current pixel may be less visually differentiated from those of the neighboring pixels even when the differences between the values of the current pixel and the neighboring pixels are large. Thus, the salt noise is less likely to occur in the other region 13 or 15 and the adaptive offset determination unit 111 may not thus perform offset value adjustment to increase the efficiency of coding.

Figure 13:
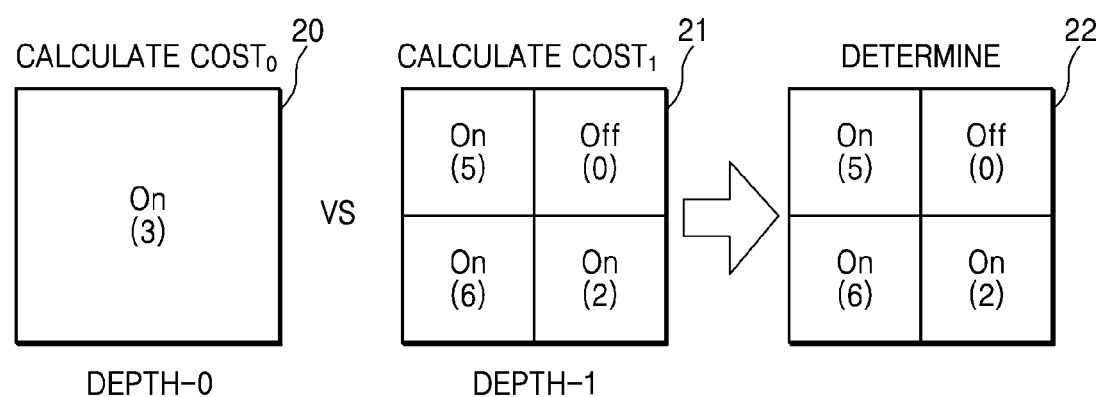
FIG. 13 is a diagram illustrating a method of determining a block division structure according to an exemplary embodiment.
Figure 13:
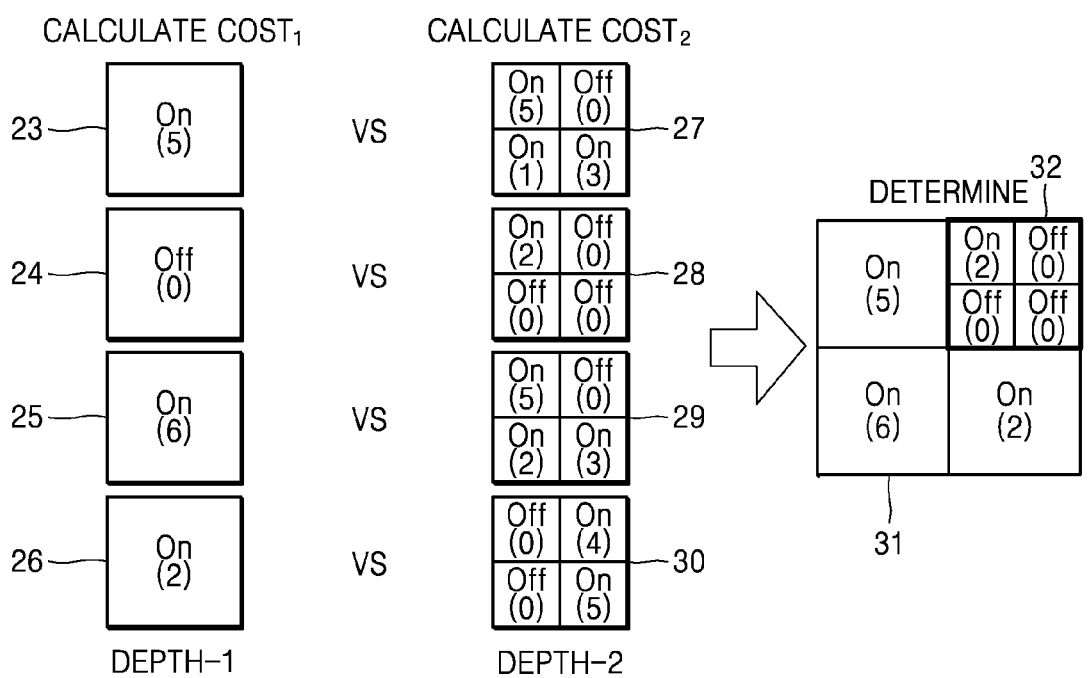

FIG. 13 is a diagram illustrating a method of determining a block division structure according to an exemplary embodiment.

Referring to FIG. 13, the adaptive offset determination unit 111 may compare the efficiency of coding a block 20 with the efficiency of coding blocks 21 divided from the block 20 to determine a block division structure and a SAO type of an image.

Specifically, the adaptive offset determination unit 111 mat determine a SAO type and a block division structure for the LCU block 20 of a depth '0'. The blocks 21 are four blocks of a depth '1' that are divided from the block 20 of the depth '0'. The adaptive offset determination unit 111 may determine an optimum SAO type and an offset value for each of categories classified according to the optimum SAO type with respect to each of the block 20 of the depth '0' and the blocks 21 of the depth '1' as shown in blocks 22. The adaptive offset determination unit 111 may compare the efficiency of coding the block 20 of the depth '0' with the efficiency of coding the blocks 21 of the depth '1', based on the determined offset values.

When the efficiency of coding the block 20 of the depth '0' is higher than the efficiency of coding the blocks 21 of the depth '1', the SAO type of the block 20 of the depth '0' may be finally determined. Thereafter, the efficiency of coding another block having the depth '0' and the SAO type of which is not determined may be compared with the efficiency of coding the blocks 21 of the depth '1'.

When the efficiency of coding the blocks 21 of the depth '1' is higher than the efficiency of coding the block 20 of the depth '0', the efficiency of coding blocks 23, 24, 25, and 26 of the depth '1' may be compared with the efficiency of coding blocks 27, 28, 29, and 30 having a depth '2' and divided from the blocks 23, 24, 25, and 26.

Since the efficiency of coding the blocks 23, 25, and 26 of the depth '1' is higher than the efficiency of coding the blocks 27, 29, and 30, the blocks 23, 25, and 26 may not be thus divided into sub-blocks. Since the efficiency of coding the block 24 of the depth '1' is lower than the efficiency of coding the blocks 28 of the depth '2', the efficiency of coding the block 24 may be compared with the efficiency of coding blocks divided from the blocks 28 of the depth '2'.

A block 31 denotes an example of a block, the block division structure of which is partially determined. The blocks 23, 25, and 26 are finally determined to not be divided into sub-blocks and to be determined as blocks of the depth '1'. In contrast, in the block 31, the efficiency of coding a block 32 divided into sub-blocks is determined to be higher than the efficiency of coding the sub-blocks. Thus, the block 32 divided into the sub-blocks may be subdivided into blocks.

According to an exemplary embodiment, if an offset value is applied to the value of a pixel, when the value of the pixel is determined to be less then or greater than those of neighboring pixels, the performance of compression and an encoding/decoding speed may be improved while effectively preventing the salt noise from occurring by applying an offset value to a restored image based on the human visual system.

Exemplary embodiments may be embodied as computer readable code in computer readable recoding media (including various devices having an information processing function). The computer readable recording media include various types of recording apparatuses capable of storing data that is read by a computer system, e.g., a read-only memory (ROM), a random access memory (RAM), a compact disc (CD)-ROM, a magnetic tape, a floppy disk, an optical data storage device, and so on.

Although characteristics of the exemplary embodiments have been discussed in the present disclosure, it would be obvious to those of ordinary skill in the art that the above exemplary embodiments are to cover all modifications, equivalents, and alternatives falling within the scope of the inventive concept. Accordingly, it will be understood that various changes in form and details may be made therein without departing from the spirit and scope of the following claims.

The invention claimed is:

1. A method of determining an offset, the method comprising:
   dividing a current image into a plurality of blocks;
   determining a category of pixels in each of the plurality of blocks, based on values of neighboring pixels;
   determining an offset value for pixels belonging to the category; and
   adjusting the offset value, based on characteristics of the category and a background pixel value of each of the pixels,
   wherein the offset value is an average of differences between values of original images and restored images of pixels belonging to one category, and
   wherein the background pixel value is an average of values of pixels in a background pixel block to which the pixels belong among background pixel blocks divided to calculate a background pixel value.

2. The method of claim 1, wherein the adjusting of the offset value comprises:
   detecting the background pixel value of a pixel corresponding to the offset value; and
   adjusting the offset value based on the detected background pixel value and characteristics of the category.

3. The method of claim 2, wherein the detecting of the background pixel value comprises detecting the background pixel value of the pixel corresponding to the offset value when the characteristics of the category correspond to a local minimum value or a local maximum value.

4. The method of claim 1, wherein the adjusting of the offset value comprises:
   determining whether the background pixel value is within a visually sensitive region; and
   adjusting the offset value according to a result of the determining whether the background pixel value is within the visually sensitive region.

5. The method of claim 1, wherein in the adjusting of the offset value, the offset value is adjusted to '0' when the characteristics of the category correspond to a local minimum value, the background pixel value is within a visually sensitive region, and the offset value is a negative value and when the characteristics of the category correspond to a local maximum value, the background pixel value is within the visually sensitive region, and the offset value is a positive value.

6. The method of claim 1, wherein in the adjusting of the offset value, the offset value is adjusted to '0' when a value of a current pixel is equal to a value of a first neighboring pixel and less than a value of a second neighboring pixel, and the offset value is a negative value and when the value of the current pixel is equal to the value of the first neighboring pixel and greater than the value of the second neighboring pixel, and the offset value is a positive value.

7. The method of claim 1, further comprising compensating for pixel values of the restored images in units of categories by using the offset value.

8. A video encoding apparatus comprising:
   an encoder configured to encode a current image;
   a decoder configured to decode the encoded current image to produce a restored image of the current image;
   an offset determiner configured to divide the current image into a plurality of blocks, determine a category of pixels in each of the plurality of blocks based on values of neighboring pixels, and determine an offset value for pixels belonging to the category; and
   an offset adjuster configured to adjust the offset value based on characteristics of the category and a background pixel value of each of the pixels,
   wherein the offset value is an average of differences between values of original images and restored images of pixels belonging to one category, and
   wherein the background pixel value is an average of values of pixels in a background pixel block to which the pixels belong among background pixel blocks divided to calculate a background pixel value.

9. The video encoding apparatus of claim 8, wherein the offset adjuster is further configured to detect the background pixel value of a pixel corresponding to the offset value, and to adjust the offset value based on the detected background pixel value and the characteristics of the category.

10. The video encoding apparatus of claim 9, wherein the offset adjuster is further configured to detect the background pixel value of a pixel corresponding to the offset value when the characteristics of the category correspond to a local minimum value or a local maximum value.

11. The video encoding apparatus of claim 8, wherein the offset adjuster is further configured to determine whether the background pixel value is within a visually sensitive region, and to adjust the offset value based on a result of determining whether the background pixel value is within the visually sensitive region.

12. The video encoding apparatus of claim 8, wherein the offset adjuster is further configured to adjust the offset value to '0' when the characteristics of the category correspond to a local minimum value, the background pixel value is within a visually sensitive region, and the offset value is a negative value and when the characteristics of the category correspond to a local maximum value, the background pixel value is within the visually sensitive region, and the offset value is a positive value.

13. The video encoding apparatus of claim 8, wherein the offset adjuster is further configured to adjust the offset value to '0' when a value of a current pixel is equal to a value of a first neighboring pixel and less than a value of a second neighboring pixel and the offset value is a negative value and when the value of the current pixel is equal to the value of the first neighboring pixel and greater than the value of the second neighboring pixel, and the offset value is a positive value.

14. A video decoding apparatus comprising:
   a decoder configured to decode an encoded current image to produce a restored image of the current image; and
   an offset applier configured to decode an encoded offset value and apply the decoded offset value to the restored image,
   wherein an offset value for pixels belonging to a category is determined by dividing the current image into a plurality of blocks and determining a category of pixels in each of the plurality of blocks based on values of neighboring pixels, wherein the offset value is adjusted based on characteristics of the category and a background pixel value of each of the pixels, wherein the offset value is an average of differences between values of original images and restored images of pixels belonging to one category, and wherein the background pixel value is an average of values of pixels in a background pixel block to which the pixels belong among background pixel blocks divided to calculate a background pixel value.

15. A non-transitory computer readable recording medium having recorded thereon a program causing a computer to perform the method of claim 1.

16. A video decoding method, the method comprising:

decoding an encoded current image to produce a restored image of the current image; and decoding an encoded offset value and applying the decoded offset value to the restored image, wherein the offset value is determined for pixels belonging to a category by dividing the current image into a plurality of blocks and determining the category of pixels in each of the plurality of blocks based on values of neighboring pixels, and wherein the offset value is adjusted based on characteristics of the category and a background pixel value of each of the pixels.

17. The decoding method of claim 16, wherein the offset value is an average of differences between values of original images and restored images of pixels belonging to one category.

18. The decoding method of claim 16, wherein the background pixel value is an average of values of pixels in a background pixel block to which the pixels belong among background pixel blocks divided to calculate a background pixel value.

19. A non-transitory computer readable recording medium having recorded thereon a program causing a computer to perform the method of claim 16.

\* \* \* \* \*